United States Patent [19]

Salem

[11] 4,197,524

[45] Apr. 8, 1980

[54] TAP-ACTUATED LOCK AND METHOD OF ACTUATING THE LOCK

[75] Inventor: Robert J. Salem, Danbury, Conn.

[73] Assignee: General Electric Company, New York, N.Y.

[21] Appl. No.: 974,525

[22] Filed: Dec. 29, 1978

[51] Int. Cl.² ................................................ H04Q 9/00

[52] U.S. Cl. ............................ 340/147 MD; 340/543; 340/148; 340/164 R

[58] Field of Search ........... 340/147 MD, 148, 164 R, 340/149 A, 149 R, 543

[56] References Cited

U.S. PATENT DOCUMENTS 3,911,397 10/1975 Feeny .......................... 340/147 MD

*Primary Examiner*—Harold I. Pitts

*Attorney, Agent, or Firm*—Carlos Nieves; George R. Powers; John F. Cullen

[57] ABSTRACT

An electromechanical lock detects a series of taps on a surface. After converting the taps into a series of electrical signals, processes the signals and compares the tap sequence with a pre-set code.

10 Claims, 6 Drawing Figures

TAP-ACTUATED LOCK AND METHOD OF ACTUATING THE LOCK

BACKGROUND OF THE INVENTION

1. Field of the Invention

The present invention generally relates to the art of locks, and more specifically to a lock and method of actuating the same by means of a series of taps on a selected surface such as a door.

2. Description of Prior Art

Electronic locks have been used for many years and have become increasingly popular with minimaturization of electrical components which has made it possible to provide very large numbers of combinations within a compact lock structure.

The early attempts simply utilized externally accessible, normally push-button switches which were required to be actuated in a predetermined sequence. The following patents are illustrative of such electronic locks:

U.S. Pat. Nos. 3,411,152; 3,633,167; 3,584,486; 3,660,729; 3,587,950; 3,717,866; 3,754,164.

In U.S. Pat. No. 3,659,154 there is disclosed an electronic lock and alarm system which utilizes a manually operated code input matrix in the nature of a keyboard for providing a selected sequence of binary coded signals. In U.S. Pat. No. 3,128,414 there is described a pulse producing means in the nature of a dial telephone.

Also popular in early electronic locks was the use of magnetic keys and perforated cards. For example, in U.S. Pat. No. 3,622,991 there is disclosed an electronic locking system which makes use of a card key perforated in accordance with a desired code. A plurality of bulbs are located on one side and photosensors on the other side of the card, correct registry providing the necessary enable signal. A typical lock using a magnetic card is disclosed in U.S. Pat. No. 3,926,021 where the card is magnetically coded and the code can be sensed by a reading device into which the card is placed.

A disadvantage of the above-described electronic locks is that they require an element of the lock to be exposed outside of the protected area. This may be in the form of a set of push-button switches or a key reader. Because of the accessibility of such elements, they may be easily tampered with or vandalized. In addition, those electronic locks which require a coded key of one form or another have the additional disadvantage that the authorized person is required to carry such key and use the same in order to obtain access. Of course, this presents the additional problem that the key can be lost or stolen and can be used by any unauthorized person who obtains possession of the key. The ability to open the lock in such cases is not based on one's personal knowledge of a combination of the lock but such combination is embodied in the physical key itself.

Some attempts have been made to overcome the above disadvantages. Thus, in U.S. Pat. No. 3,764, 982 there is disclosed a sequentially coded or actuating device which uses a plurality of conductive areas or gaps which must be bridged by the user, and can be arranged in an artistic configuration or incorporated in a work of art. This is intended to conceal the electrical gaps to thereby avoid tampering therewith or vandalism thereof. However, the device disclosed relies on the inherent resistance of a person's finger when placed over the gaps to bridge the same and this may result in erroneous readings since these are particularly sensitive to atmospheric conditions and the nature of any films that may coat the finger of the user.

In an attempt to make an electronic clock totally tamper and vandal proof, at least one lock utilizes a concealed receiver and lock actuating mechanism in the nature of a portable transmitter. This locking apparatus is disclosed in U.S. Pat. No. 3,794,848. Another electrical combination lock which conceals its actuating elements is disclosed in U.S. Pat. No. 3,772,574, wherein a hidden magnetic reed array is used and a portable electromagnet is provided which an operator can selectively key to generate a series of pulses which actuate the hidden reeds. However, in both of the two aforementioned patents, authorized personnel must carry relatively expensive transmitter devices. If many individuals are authorized entry, this can represent a significant expense. Additionally, as with the above-described card or coded key devices, these are subject to loss and damage.

In U.S. Pat. No. 3,885,408, there is described a finger operated electro-optical lock which uses an optical keyboard having at least one zone illuminated by ambient light. When this zone is touched by a finger, the light is blocked, this actuating a counter to cycle a numeric display. When the first digit of the combination appears in the display, the finger is lifted and reapplied until the second digit of the combination is displayed. This process is repeated until each digit of the combination has been displayed. While this lock dispenses with a separate coded member which must be carried by the authorized user, it suffers the same disadvantages discussed above in connection with all locks which use externally accessible elements and, as those other locks, may be tampered with and vandalized.

Other novel approaches have been suggested. However, these are significantly more elaborate and more expensive to implement. Accordingly, these approaches do not lend themselves to most applications, including the mass consumer market. By way of example, only, video examination is disclosed in U.S. Pat. No. 4,006,459, fingerprint analysis in U.S. Pat. No. 2,936,607, analysis of body curvature in U.S. Pat. No. 3,805,238, signature analysis in U.S. Pat. No. 3,955,178, study of the wave polarization applied to a part of a person's body in U.S. Pat. No. 3,990,436 and identification using reference beam coded holograms in U.S. Pat. No. 3,647,275.

SUMMARY OF THE INVENTION

It is an object of the present invention to provide a method of actuating an electronic lock which does not have the disadvantages inherent in prior art locks.

It is another object of the present invention to provide a method of actuating an electronic lock which is simple in construction and economical to manufacture.

It is still another object of the present invention to provide a method of actuating a lock that does not require the operator to carry an object which is necessary for the lock's operation.

It is yet another object of the present invention to provide a method of actuating an electronic lock which does not require that an object be located outside of the door and thereby prevents tampering with the lock.

It is a further object of the present invention to provide a method of actuating a lock of the type above suggested which is convenient to use by all authorized users and yet is highly reliable.

It is still a further object of the present invention to provide an apparatus for actuating an electronic lock which embodies the novel method.

Briefly, the method in accordance with the present invention for actuating a lock includes the steps of detecting a series of sequential taps on a selected surface and generating an electrical signal for each detected tap to form a series of sequential electrical signals spaced in time from each other to correspond with the time intervals between the taps. The time intervals between each two successive electrical signals is then determined and the electrical signals are grouped into a plurality of sets of successive electrical signals as a function of preselected parameters of the time intervals between the signals. The number of electrical signal in each set is then compared with a preselected code and the lock is enabled only when the number of electrical signals within each set corresponds to the preselected code. The apparatus of the invention includes elements necessary to carry out the above steps.

BRIEF DESCRIPTION OF THE DRAWINGS

The above-mentioned and other objects and features of the invention will become apparent by reference to the following description in conjunction with the accompanying drawings, in which.

DETAILED DESCRIPTION

Figure 1:
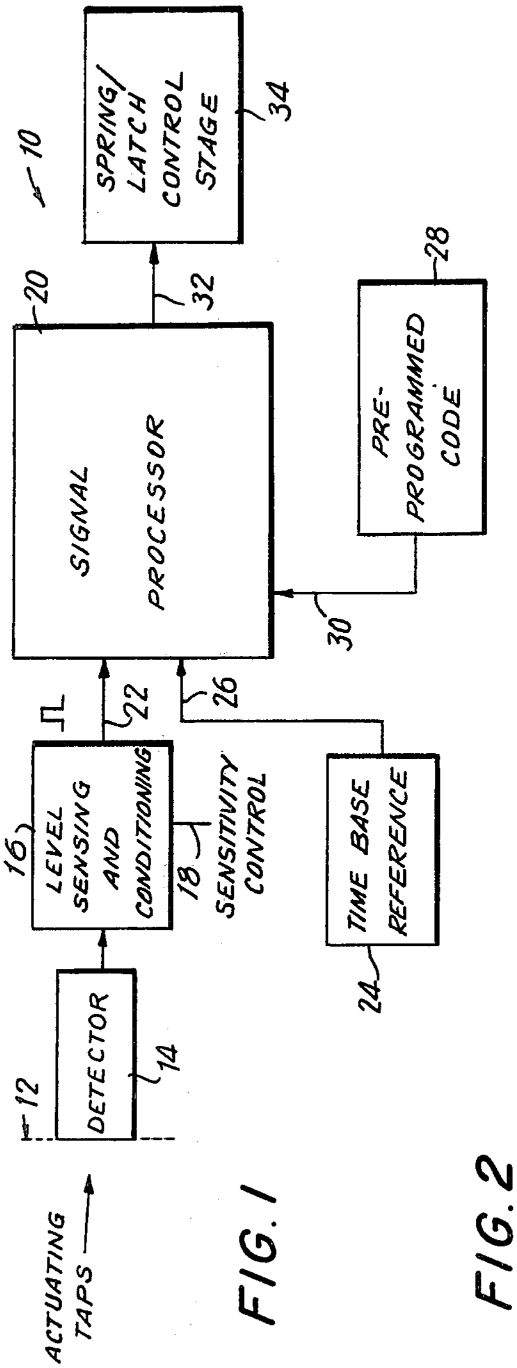
FIG. 1 is a general block diagram illustrating a device which carries out the method of the present invention.

Referring now to the Figures, in which identical or similar parts are designated by the same reference numerals throughout, and first referring to FIG. 1, the tap-actuated lock is generally represented by the reference numeral 10.

The reference numeral 12 designates a preselected surface, such as a door, which is to be tapped to gain access to a secured area. Of course, the surface 12 need not be part of the door itself but may be any adjoining or other surface which may be conveniently tapped by an authorized person.

Cooperating with the surface 12 is a detector 14. The detector 14 may be in the nature of any transducer which can convert a tap on the surface 12 into an electrical signal. Thus, the detector 14 can be in the nature of a piezoelectric crystal, microphone or the like which is mounted on the surface 12 in a manner which does not expose it to those outside of the protected area.

The detector 14 is connected to a level sensing and conditioning device 16, the function of which is to amplify, if necessary, the output signals from the detector 14 and shape such signals to provide relatively clean pulses suitable for processing with conventional logic circuitry. This is particularly important since the output from the detector 14 may be highly distorted and contain noise and undesired high-frequency components. Advantageously, the circuit 16 has a sensitivity control 18 which permits selection of the threshold level of voltages at the input to the circuit 16 which will result in an output pulse. In this way, noise as well as other spurious signals can be discounted by the system and this enhances its reliability.

The pulses at the output 22 of the circuit 16 are fed to a signal processor 20 the function of which, in essence, is to determine whether the taps on the surface 12 are in sequence which corresponds to a preset code. The signal processor 20 normally utilizes a time base reference 24 the output 26 of which is connected to the processor as is a pre-programmed code 28 having an output 30. Operating for a duration determined by the time base reference 24, the signal processor processes the signals at the level sensing and conditioning circuit output 22 and determines whether the signals are arranged in accordance with a code which has been preset in the device 28. Only when the taps or the signals at the input to the signal processor 20 are arranged in the time sequence does the signal processor 20 generate an enable signal at its output 32 to thereby actuate a spring/latch control stage 34. The stage 34 represents any electrically operated element or component. For example, the method and apparatus of the present invention may be used in conjunction with the J. H. Clark Jr. Electric Lock described in U.S. patent application Ser. No. 971,868, filed on Dec. 21, 1978, which application is owned by the assignee of this application.

Figure 2:
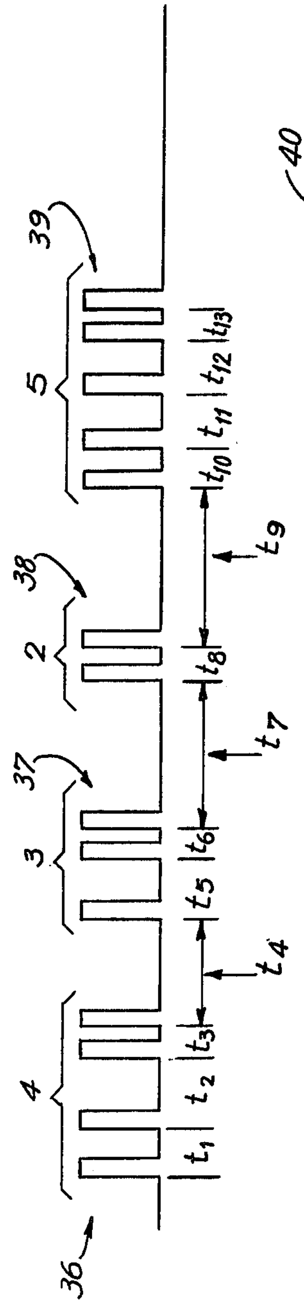
FIG. 2 is a representation of the manner in which a series of sequential signals may be grouped in accordance with the present invention to form a plurality of sets of successive electrical signals.
Figure 3:
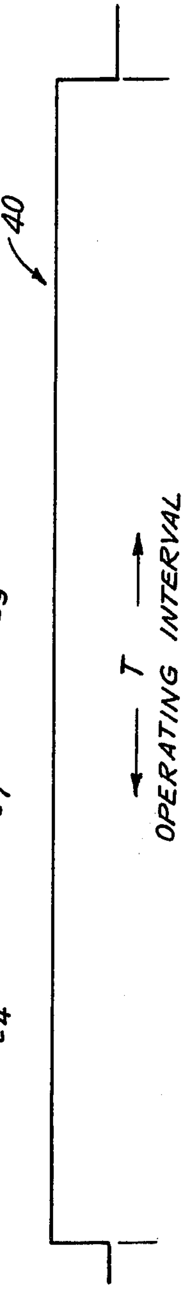
FIG. 3 illustrates a pulse which represents a window during which the pulses shown in FIG. 2 may be received for purposes of analysis.

While it will become apparent from the description that follows that any number of specific electronic circuits or coding schemes can be used in order to practice the method of the present invention, what will now be described in connection with FIGS. 2 and 3 is one scheme, only for purposes of illustration, wherein the coded tap combination is a four-number code where each number may be formed by one to six taps. In FIG. 2, there is shown a series of electrical signals each corresponding to a tap on the surface 12. The signals, as shown, appear at the output of the level sensing and conditioning circuit 16 and are in suitable condition for processing by conventional logic circuitry.

It will be noted, still referring to FIG. 2, that the electrical signals or pulses are spaced from each other, the time delays $t_1$, $t_2 \ldots t_{12}, t_{13}$ being typically different from each other and may, theoretically, be any value. These time delays between the pulses correspond to the time delays between the taps on the surface 12. With the example being described, all that is required on the part of the operator is that he deliberately hesitate between tapping the four specific code numbers. Thus, if the pre-programmed code 28 is arranged to provide the code "4, 3, 2, 5" it will be required for the authorized user to tap the surface 12 initially four times, hesitate, tap the surface three times, hesitate, tap the surface twice more, hesitate and finally tap the surface five times. With this simple operator requirement satisfied, the electronic sensing-processing circuitry internal to the lock can process the incoming pulses, match them with the pre-programmed code and energize the spring/latch control 34.

In processing the incoming pulses, the signal processor 30 must determine the time intervals between each two successive electrical signals or pulses and group the same into a plurality of sets of successive electrical signals as a function of a preselected parameter of the inter-pulse time intervals.

Referring to FIGS. 2 and 3, upon the first tap on the door, a time period T is initiated. Within this time interval T, the operator must tap the correct code. At the end of the time interval T, the processor 20 must compare all time periods between the taps and identify the three longest time periods between the taps, namely periods $t_4$, $t_7$ and $t_9$ in FIG. 2. The processor now counts the number of individual taps between the three longest time periods so that it will determine that there are four pulses in set or group 36, three pulses in set 37, two pulses in set 38 and five pulses in set 39. As suggested above, these number of pulses within each set are then compared to the pre-set combination in the coding device 28 and if the combination is correct, the door will unlock. If not, the electronic control will reset and await another tapping combination.

Of course, using the longest inter-pulse time delays as the parameter or criterion for separating the sequence of pulses into a series of sets, while preferred, is not critical. For example, selecting the shortest time intervals or using time intervals having selected predetermined values is also possible. Whatever the criterion, of course, the authorized personnel must be provided with this information and correspondingly enter the code when tapping in the combination.

With the scheme described above, the processor 20 interrogates and determines the identity of the longest intervals at the end of the period T. Clearly, the period T can be any suitable period as long as it is long enough for any authorized user to introduce or tap in the code. A period T of 10–20 seconds should be ample for most users to tap in the coded sequence. Once the window 40 closes at the end of the operating interval T, any subsequent pulses which are transmitted to the signal or processor 20 are not considered, unless the processor has detected an error input signal and the system is reset. The time base reference 24 may be used to generate the window 40.

Figure 4:
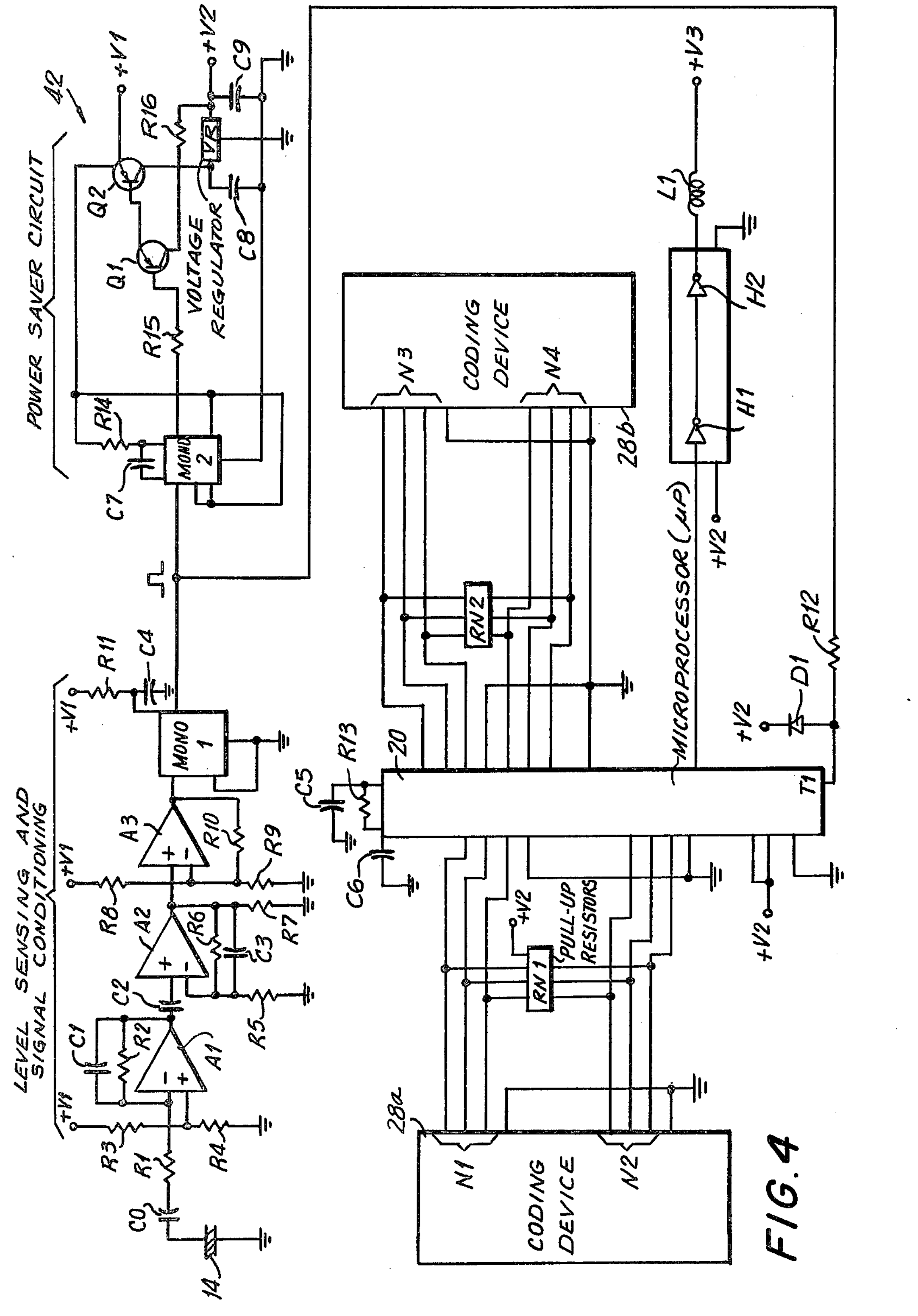
FIG. 4 is an electrical schematic of an electronic lock which embodies the present invention.

Referring to FIG. 4, there is illustrated a circuit which can implement the method of the present invention. Although the circuit shown on FIG. 4 foundamentally operates in the same manner described above in connection with FIG. 1, the operation is slightly different as will be evident from the description of FIGS. 5 and 6.

In FIG. 4, the detector 14 is in the nature of a piezoelectric transducer which is capacitively coupled to the level sensing and conditioning circuit 16. When the selected surface 12 is tapped, the piezoelectric sensor or transducer responds to the mechanical vibrations of the surface and generates a voltage across its terminals which includes low and high frequencies, as well as noise.

To condition the outputs of the sensor 14, the level sensing and signal conditioning circuit 16 includes two operational amplifying stages A1 and A2 which are provided with capacitors C1 and C3 across their respective feedback resistors which cause these amplifiers to have a low pass frequency response. Capacitors C1 and C3, accordingly, serve to remove most high-frequency transients as well as high frequency noise.

A further amplifier A3 is provided which additionally amplifies the incoming signals and shapes the same into pulses having a sufficient rise time to trigger a monostable multivibrator, as to be described.

By way of example only, the amplifiers A1, A2 and A3 may be part of the low power quad operational amplifiers LM324 made by, for example, National Semiconductor Corporation.

To assure proper shaping and levels of pulses for processing by conventional logic circuits, there is used in the circuit shown in FIG. 4 a monostable multivibrator MONO 1 which is triggered by the pulses emanating from the amplifier A3 to produce a single output pulse for each pulse at its input. Resistor R11 and capacitor C4 are selected to provide the desired pulse width of the output pulses. It has been found that a pulse width of 60 msec. is satisfactory.

The pulses at the output of MONO 1 are used for two purposes. Firstly, of course, the output pulses are used for further processing to determine whether the pulses are arranged in a predetermined sequence as described above. However, the conditioned pulses may also be used to activate a power saver circuit 42. The purpose of the power saver circuit is to conserve power when the device is not used and to apply full power only following the first tap on a surface. This, of course, is particularly useful with battery operated units.

The power saver circuit 42 includes a monostable multivibrator MONO 2 which is provided with a time constant determined by resistor R14 and capacitor C7. The multivibrators MONO 1 and MONO 2 may be, for example, the COS/MOS dual monostable multivibrator type CD4098B supplied, for example, by RCA. As used in the circuit of FIG. 4, MONO 1 is connected in a non-retriggerable mode, while MONO 2 is arranged in a retriggerable mode. Accordingly, MONO 2 resets after each pulse from MONO 1 and, in effect, has an output pulse width which is extended one full time period or pulse width after application of the last trigger pulse. The voltage V1 is always applied to the level sensing and signal conditioning circuit 16 as well as to the power saver circuit 42. The MONO 2, in conjunction with transistors Q1 and Q2, provide a second voltage V2 at the output of voltage regulator VR. The voltage V2 is the voltage applied to the signal processing circuitry, including the processor 20 and the driving or lock enabling circuitry to be described. For conventional logic circuits, V2 is typically selected to be +5 volts DC and V2 is maintained for a predetermined time after the last tap. This may be five, ten or even thirty seconds after the last tap. In this way, once further taps are no longer being detected, the power saver circuit 42 ceases to apply V2 to the processing circuitry and this decreases the battery drain, particularly by the microprocessor 20.

As with FIG. 1, the pulses at the output of the level sensing and signal conditioning circuit 16 are fed to a signal processor 20. In FIG. 4, this is done through a diode clamping circuit consisting of resistor R12 and diode D1 as shown. The cathode of the diode D1 is connected to V2 so that any pulses at the output of MONO 1 which have an amplitude greater than V2, or plus five volts in the example being described, the diode will clamp the microprocessor 20 input $T_1$ at the level V2. This is a protection circuit which prevents application of excessively high amplitude pulses to the microprocessor.

The coding scheme used in FIG. 4 includes programmable thumbwheel switches. As with the description of of FIGS. 1–3, the circuit of FIG. 4 is also designed to group the sequence of taps into four sets of pulses and to detect a four digit code. Accordingly, the thumbwheel switches 28*a* and 28*b* each include two stacked thumbwheel switches each separately adjustable to select an integer (N1–N4) between one and six. This sets the maximum number of pulses which may be permitted within one group or set of pulses. Since only six digits are to be detectable in each group, three bits of binary information can fully define the integer in each group.

Each thumbwheel switch is arranged to provide a straight BCD output on three lines each carrying one bit of information. Each thumbwheel switch is connected to the microprocessor 20 and to a pull-up resistor included in the resistor networks RN1 or RN2. The networks RN1 and RN2 may both be housed within a common dip package, but are shown separate for facility of illustration. Although straight BCD outputs are used in the circuit of FIG. 4, this is not a critical feature of the present invention and any other switches having any desired truth tables may be used so long as the processing circuitry is properly programmed to detect and manipulate the data at the output of the switches.

The microprocessor 20 may be any microprocessor or discreet logic which can achieve the above-described functions. A microprocessor, for example, from the MCS-48 family of single chip microcomputers, such as the 8748, made by Intel Corporation may be used. When the 8748 microprocessor is used, the pull-up resistors inside the resistor networks RN1 and RN2 bring up the voltage at the inputs to the microprocessor to V2 when a set of contacts within a thumb wheel switch is open. Of course, when the switch is closed, the corresponding microprocessor pin is grounded.

The resistor R13 and the capacitors C5 and C6 are connected to the crystal contacts of the microprocessor and determine the time base or oscillator frequency at which the microprocessor operates.

Microprocessors in the MCS/48 family are suitable for this application because they have two 8-bit I/O ports as well as an 8-bit BUS port which can have statically latched outputs. Additionally, an 8-bit onboard timer/counter can be used as an event counter or timer with an external clock applied to the T1 input pin. This facilitates the programming of the routine required to perform the above-described pulse signal processing.

The 8748 microprocessor monitors and times the pulses from the interface circuitry 16 and decides whether or not the tap sequence agrees with the pattern on the thumbwheel switches 28*a* and 28*b*. A coil L1, such as of a solenoid, is connected to a voltage V3 and to the microprocessor 20 by means of buffer inverters H1 and H2. The inverter H1 is connected to a pin of the 8-bit BUS port which serves as a statically latched output port.

The inverter H1 is connected to only one of the eight pins of the BUS port and, on the appropriate command a suitable bit of information can be transmitted to the appropriate pin to energize the coil L1.

In implementing the microprocessor 20, a program must be written which initializes the microprocessor (INIT), this zeroing out all "tap" storage, conditions of the thumbwheel switches, and applies a logical "one" at the input to inverter H1 in order to apply a high voltage at the output of inverter H2. This prevents large currents from flowing through the coil L1 to energize, for example, the lock solenoid. The next routine (TPROC) of the microprocessor is to debounce the taps coming in to the T1 port, the microprocessor storing the relative time between each pulse and monitors the time status.

Figure 5:
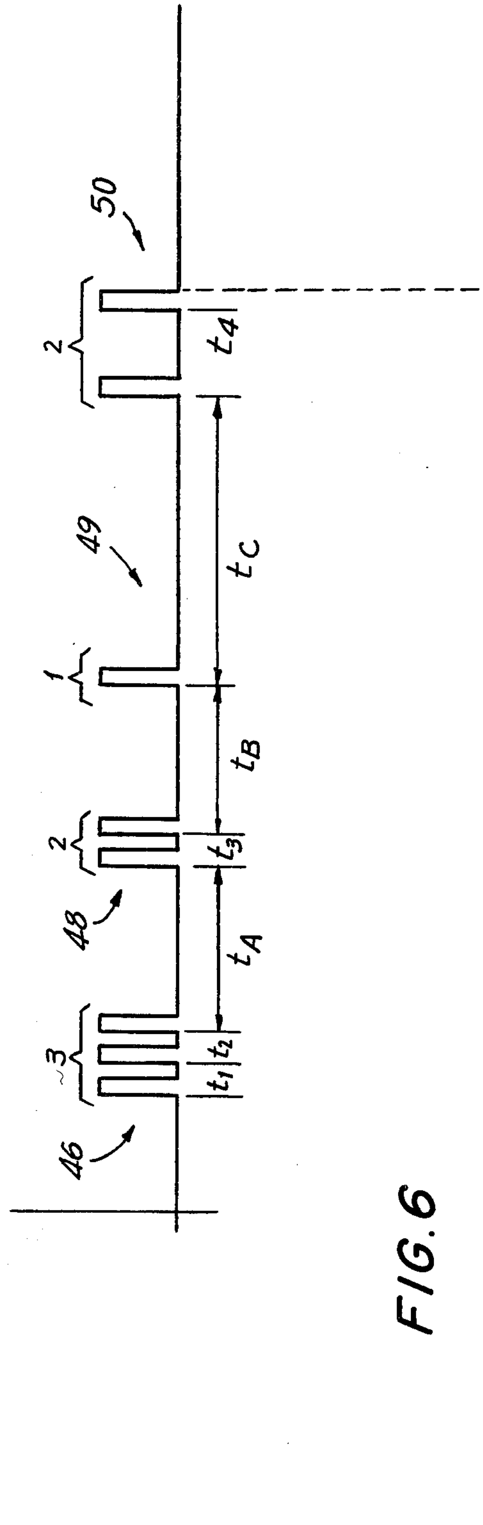
FIG. 5 is similar to FIG. 2, but shows a different sequence of taps or electrical signals.
Figure 6:
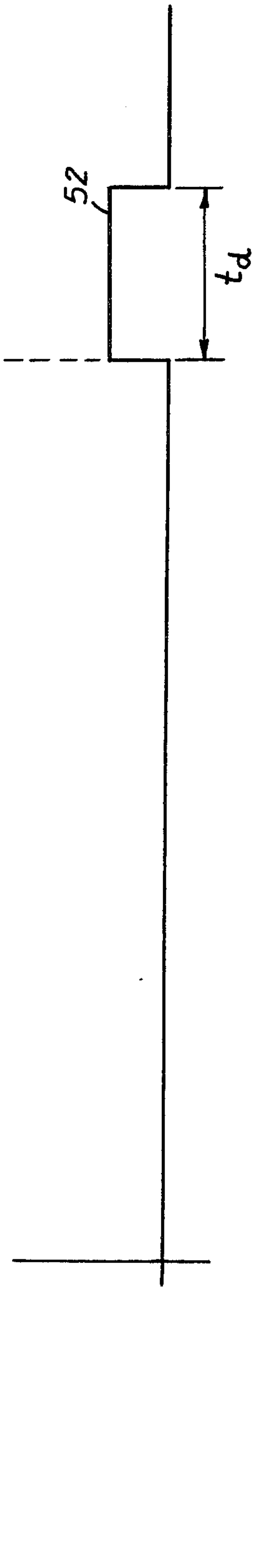
FIG. 6 illustrates a pulse formed following the last tap or electrical signal and forms a window used in conjunction with the pulses shown in FIG. 5 in the scheme or circuit shown in FIG. 4.

The microprocessor updates (TIME) a relative time counter, re-initializes the times and checks if more than four seconds have elapsed. Referring to FIGS. 5 and 6, it will be noted that after a series of sequential pulses have been generated and detected by the microprocessor 20 the microprocessor generates a window 52 where $t_d$ is equal to approximately four seconds. This serves to test whether any additional pulses are forthcoming. Again, this window 52 may have any desired time period, although four seconds is deemed adequate. If more than four seconds have elapsed without additional pulses being detected, the microprocessor jumps to the processing section of the program (PROC). If not, it returns to the previous part of the program (TPROC) wherein it stores the relative times between the various pulses and monitors the time status.

In processing the pulses (PROC), the microprocessor 20 breaks the pulses into groups as shown in FIG. 5, calculates the tap code entered by the thumbwheel switches 28*a* and 28*b*, reads the thumbwheel switches, compares the tap code with the thumbwheel switch inputs and enables the solenoid coil L1 only when the proper code has been matched.

Although eight binary outputs may be available at the BUS port, an appropriate enable or disable signal may be applied to the buffer inverters by transmitting a suitable code to the microprocessor accumulator depending on whether the detected pulses are arranged in accordance with the proper code. Any binary number may be moved from the accumulator to the BUS pins as long as the bit applied to at the input to H1 is a binary "zero" only when the coil L1 is to be energized.

The buffer inverters may be, for example, in the nature of hex inverters. The type SN7404 made by Signetics may be used. Normally, the SN7404 has a maximum output current of 33 ma, so that if the coil L1 requires additional current, two or more sets of hex inverters may be arranged in parallel to provide the current requirements. Two hex inverters H1 and H2 are provided because the microprocessor 20 tends to come on with a high logic level "1" at the output of the BUS port. If only one hex inverter were used, therefore, this may result in the coil L1 being inadvertently energized during start-up of the circuit.

Since seven additional output ports are available at the BUS terminals, it is also possible to provide additional signal outputs or control additional devices with the microprocessor 20. For example, it is possible to turn on remote lights or audible alarms when the lock is opened or when an incorrect code is tapped in.

While not critical, the following component values have been found to provide satisfactory results with the circuit shown in FIG. 4:

| | | |
|---|---|---|
| R1 - 10 Kohm | R7 - 10 Kohm | R13 - 20 Kohm |
| R2 - 510 Kohm | R8 - 10 Kohm | R14 - 1 Mohm |
| R3 - 50 Kohm | R9 - 10 Kohm | R15 - 18 Kohm |
| R4 - 50 Kohm | R10 - 100 Kohm | R16 - 56 ohms |
| R5 - 3 Kohm | R11 - 1.5 Mohm | RN1, RN2 - 10 Kohm |
| R6 - 200 Kohm | R12 - 0.5 Kohm | CO - 0.1 μf |

| | |
|---|---|
| C1 - 0.01 μf | C6 - 1 μf |
| C2 - 0.1 μf | C7 - 47 μf |
| C3 - 0.01 μf | C8 - 0.01 μf |
| C4 - 0.1 μf | C9 - 0.1 μf |
| C5 - 20 pf | Q1 - 2N2907 |

-continued

| Q2 - S5006 |
| --- |

It is to be understood that the foregoing description of the various embodiments illustrated herein is exemplary and various modifications to the embodiments shown herein may be made without departing from the spirit and scope of the invention.

I claim:

1. Method of actuating a lock comprising the steps of detecting a series of sequential taps on a selected surface and generating an electrical signal for each detected tap to form a series of sequential electrical signals spaced in time from each other to correspond to the time intervals between the taps; determining the time intervals between each two successive electrical signals; grouping said electrical signals into a plurality of sets of successive electrical signals as a function of preselected parameters of said time intervals; comparing the number of electrical signals in each set with a preselected code; and enabling the lock to be actuated only when the number of electrical signals within each set corresponds to said preselected code.

2. A method as defined in claim 1, wherein the step of detecting comprises the step of generating electrical signals in response to mechanical vibrations of said selected surface.

3. A method as defined in claim 1, wherein said grouping step comprises the step of selecting a number of time intervals having the greatest duration to separate said electrical signals into said sets of electrical signals.

4. A method as defined in claim 3, further comprising the step of generating a window of a predetermined duration upon the occurrence of the initial tap of a sequence, and only considering those electrical signals which are generated in coincidence with said window.

5. A method as defined in claim 1, further comprising the steps of sensing the level of said taps and only generating corresponding electrical signals when said taps exceed a predetermined level.

6. A method as defined in claim 1, further comprising the step of conditioning said electrical signals prior to determination of the time intervals therebetween to shape said electrical signals in a manner to facilitate processing thereof.

7. Apparatus for actuating a lock comprising means for dectecting a series of sequential taps on a selected surface and generating an electrical signal for each detected tap to form a series of sequential electrical signals spaced in time from each other to correspond to the time intervals between the taps; means for grouping said electrical signals into a plurality of sets of successive electrical signals as a function of preselected parameters of said time intervals; means for comparing the number of electrical signals in each set with a preselected code; and means for enabling the lock to be actuated only when the number of electrical signals within each set corresponds to said preselected code.

8. Apparatus as defined in claim 7, wherein said means for detecting comprises a piezoelectric sensor mounted on said selected surface.

9. Apparatus as defined in claim 7, in combination with coding means for establishing said preselected code.

10. Apparatus as defined in claim 7, wherein said means for determining, grouping, comparing and enabling together comprise a microprocessor.

* * * * *